K. KAISER.
PROCESS OF MAKING NITROGEN OXYGEN.
APPLICATION FILED JULY 27, 1910.
987,375.
Patented Mar. 21, 1911.
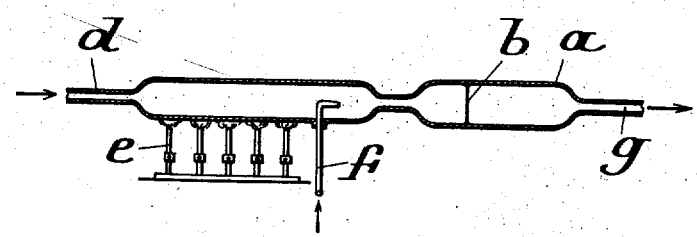
WITNESSES
John Murtagh
Joseph Collins
INVENTOR
Karl Kaiser
by Jaques Jafee
his Attorneys

UNITED STATES PATENT OFFICE.

KARL KAISER, OF WILMERSDORF, NEAR BERLIN, GERMANY.

PROCESS OF MAKING NITROGEN-OXYGEN.

987,375.  Specification of Letters Patent.  Patented Mar. 21, 1911.

Application filed July 27, 1910. Serial No. 574,083.

*To all whom it may concern:*

Be it known that I, KARL KAISER, a subject of the German Emperor, residing at 9 Xantenerstrasse, Wilmersdorf, near Berlin, Germany, have invented certain new and useful Improvements in Processes of Making Nitrogen-Oxygen Compounds from Ammonia and Air, of which the following is a specification.

My invention relates to improvements in a process of making nitrogen oxygen compounds from ammonia and air by means of contact substances.

When oxidizing ammonia by means of contact substances such for example as platinum, a loss in ammonia can never be avoided. Such a loss is caused by the complete decomposition of ammonia, whereby nitrogen in elemental form is produced.

As is well known in the art, the process may be carried out within a tube which at a suitable part is provided with a fine platinum wire gauze. The latter is heated to a temperature which is suitable for the oxidation of the ammonia (that is to a slightly red heat), and through the said tube a mixture of air and ammonia is forced. If in this process the speed of the current of gas is above a certain comparatively low limit, the central portion of the said wire gauze is cooled off. Therefore a part of the ammonia passes through the wire gauze without being subjected to the process. If the wire gauze is heated to a higher temperature the temperature at the circumferential parts of the wire gauze rises so high, that at this part the ammonia is completely decomposed, so that a part of the ammonia is wasted. When using tubes of large diameters, such as are particularly desirable for practical purposes these conditions are particularly objectionable.

I have discovered, that the aforesaid drawbacks which are objectionable in practical operation, and render the entire process impracticable, can be avoided by heating the air, before mixing the same with the ammonia to a temperature which substantially corresponds to the temperature of the reaction, that is to about 400° centigrade.

When using for example a tube of a diameter of 30 millimeters, the speed cannot be above 300 liters per hour for practical purposes, if the air is not preheated; but when heating the air to 120 degrees centigrade, the said speed can be increased to 650 liters, and when heating the air to 400 degrees centigrade, the speed can be further increased to about 1,000 liters per hour. While with a tube of a diameter of 200 millimeters the process cannot be carried out at all with cold air, it can be carried out when the air is preheated.

Heretofore a process of making nitrogen oxygen compounds from ammonia by means of contact substances has been suggested in which the mixture of air and ammonia is preheated. However, as compared to my improved process the old process is objectionable in various respects. Particularly the output is considerably lower than in my process. This has been shown by comparative tests which were made under the same conditions within a quartz tube of a diameter of 200 millimeters. The consumption of air per hour was 240 cubic meters. The consumption of ammonia was 5 kilograms per hour. In the first test exclusively the air was heated to such a temperature, that after being mixed with the ammonia it passed through the contact substance at a temperature of 320 degrees centigrade. In the second test the air was first mixed with the corresponding amount of ammonia, whereupon the mixture was heated. The thermometer (a thermo-element) was near the contact substance, and the preheating furnace was so regulated that the thermo-element indicated a temperature of 320 degrees centigrade. In the first test the output was 99.8 per cent., and in the second test only 66.8 per cent.

The figure shows a diagrammatic side elevation of an apparatus for carrying out my improved process.

In carrying my improved process out I prefer to proceed as follows: Within a tube $a$, of about two-hundred millimeters in diameter and of a suitable material, such for example as quartz, I place a fine platinum wire gauze $b$ which wire gauze extends through the entire cross-sectional area of the said tube. Through the tube I pass a mixture of air and ammonia. The air enters through a tube $d$, and it is heated, by a burner $e$, to a suitable temperature, preferably to form 300 to 400 degrees centigrade. The ammonia is admitted through a tube $f$, and the gas obtained by the process escapes at $g$.

While in the foregoing I have stated certain temperatures which according to my experiments are the best in my improved process, I wish it to be understood, that I do not limit myself to such temperatures. I have found, that the desired effect, that is an increase in the speed of the air and in the output in gas, can be obtained with lower temperatures, such for example as 100 degrees centigrade, in which case, however, the contact substance must be heated to a higher temperature.

I claim:

1. The herein described process of making nitrogen oxygen compounds from ammonia and air, which consists in first preheating the air to at least about 120° C., admixing the ammonia therewith, and passing the mixture over a contact substance.

2. The herein described process of making nitrogen oxygen compounds from ammonia and air, which consists in first preheating the air to a temperature of from 300 to 400 degrees centigrade, admixing the ammonia therewith, and passing the mixture over a contact substance.

In testimony, that I claim the foregoing as my invention, I have signed my name in presence of two subscribing witnesses.

KARL KAISER.

Witnesses:
 WOLDEMAR HAUPT,
 HENRY HASPER.